L. T. KNOWLES.
JOINTED WHEEL TREAD.
APPLICATION FILED NOV. 28, 1910.
1,009,154.
Patented Nov. 21, 1911.
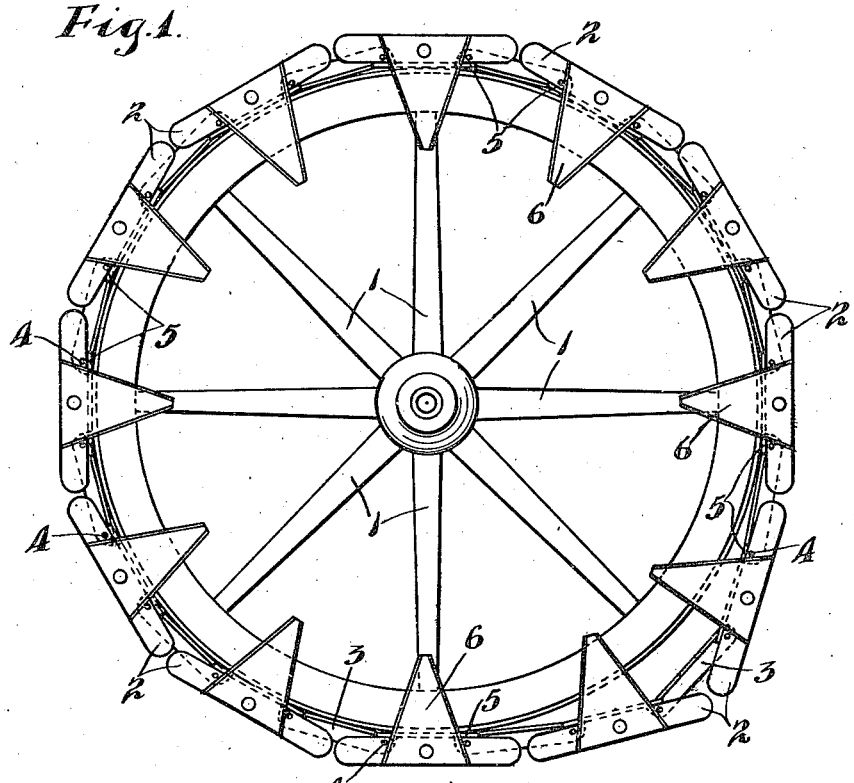
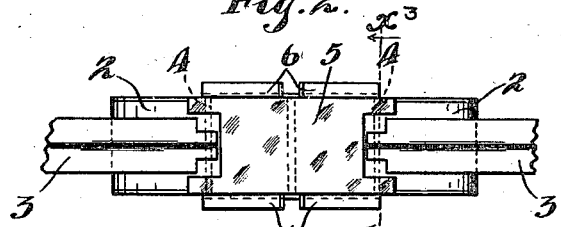
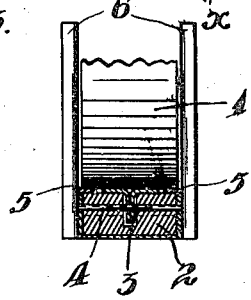
Witnesses.
Harry Opsahl.
A. H. Opsahl.
Inventor:
Louis Thomas Knowles
By his Attorneys
Williamson Merchant

UNITED STATES PATENT OFFICE.

LOUIS THOMAS KNOWLES, OF MINNEAPOLIS, MINNESOTA.

JOINTED WHEEL-TREAD.

1,009,154.  Specification of Letters Patent.  Patented Nov. 21, 1911.

Application filed November 28, 1910. Serial No. 594,531.

*To all whom it may concern:*

Be it known that I, LOUIS THOMAS KNOWLES, a citizen of the United States, residing at Minneapolis, in the county of Hennepin and State of Minnesota, have invented certain new and useful Improvements in Jointed Wheel-Treads; and I do hereby declare the following to be a full, clear, and exact description of the invention, such as will enable others skilled in the art to which it appertains to make and use the same.

My invention has for its object to provide an improved jointed wheel tread and, to this end, the invention consists of the novel devices and combinations of devices hereinafter described and defined in the claim.

The purpose of a jointed wheel tread of the character herein claimed is to provide a better ground engaging support for various kinds of vehicles such, for instance, as wagons, wheelbarrows and even for traction rigs, but especially it is intended for vehicles which must travel sandy, muddy or other soft roadbeds.

The invention, in its preferred form, is illustrated in the accompanying drawings wherein like characters indicate like parts throughout the several views.

Referring to the drawings, Figure 1 is a side elevation, showing a vehicle wheel having my improved jointed tread applied thereto; Fig. 2 is a plan view, showing a portion of the wheel tread removed from the wheel; and Fig. 3 is a section taken on the line $x^3$ $x^3$ of Fig. 2, showing also a portion of the vehicle wheel.

The vehicle wheel is indicated as an entirety by the numeral 1. This wheel may be of any suitable form but, as shown and preferred, is provided with a flat and smooth periphery.

The jointed wheel tread is in the form of an endless chain made up of ground engaging tread links or plates 2 and connecting links 3. The chain made up of these links 2 and 3 is of such size that there will be considerable play between the tread and the wheel rim on the lower advance portion of the wheel, this being necessary in order to permit the tread links or plates 2 to drop properly into engagement with the ground in front of the wheel. The connecting links 3 are pivotally connected to the tread links 2, by pivots 4, which are located approximately midway between the ends and the central portions of the said links 2, this being done for an important purpose which will hereinafter appear. Preferably, the connecting links 3 are T-shaped in cross section with the central depending flanges thereof working in slots formed in the ends of the links 2. The tread links or plates 2, in some instances, may be made of wood and, when thus formed, they are preferably provided with wearing plates 5 secured to the upper faces thereof between the ends of the pivotally connected links 3 and with which the rim or face of the wheel 1 is adapted to engage. To hold the jointed tread in position on the wheel, the tread links 2 are shown as provided with retaining arms or lugs 6 secured to the sides of the links 2 and loosely embracing the sides of the wheel rim. With this arrangement, the jointed tread is loosely mounted on the wheel rim and the wheel is kept from slipping only by frictional engagement between the wheel rim and the links of the jointed tread. This friction, however, will be sufficient for all drawn or pushed vehicles and also for almost all kinds of traction rigs.

When the wheel is rotated, the tread links or plates 2 will be dropped into contact with the ground in succession ahead of the wheel, so that they afford a sort of a track on which the wheel will run. When the wheel bears on the center of one of the tread links or plates 2, that link only will be pressed tightly into engagement with the ground, but when the wheel runs onto one of the connecting links 3, the weight will be simultaneously applied to two adjacent tread links 2. When, for instance, the wheel rests upon the central portion of one of the links 3, the weight will be evenly distributed between the adjacent half sections of the two immediately connected tread links or plates but, of course, the extended halves of the said two tread plates will be pressed also against the ground, thereby giving an extended bearing surface. With this joint tread, therefore, there is no time when less than one complete tread link or plate will be pressed into contact with the ground and caused to afford a base of support for the wheel. The wheel cannot, therefore, cut deeply into soft ground or sand and a smooth supporting surface is afforded upon which the wheel will travel. Consequently, the wheel, with its jointed tread, is adapted to travel all kinds of soft roadbeds or ground, such as plowed fields and the like, or very sandy places. Vehicles equipped with this jointed tread may, therefore, be hauled or moved over soft ground much more easily than when provided with the ordinary rims or faces; and when the wheels are used as traction wheels they cannot, even if they slip slightly, cut deep holes in the ground. Furthermore, the improved tread is of simple construction and may be easily applied to all kinds of wheels without requiring any special preparation therefor. For instance, the tread may be easily placed upon any ordinary wagon wheel and does not even require that the length of the jointed tread be very accurately adjusted thereto.

What I claim is:

The combination with a wheel, of a jointed tread therefor made up of ground engaging tread links and connecting links, the said connecting links being pivotally connected to said tread links at points intermediate of the centers and ends of said tread links, the ends of said connecting links being set into the tread links so that the inner faces of said links are flush, one with the other, and the said tread links having laterally spaced retaining arms loosely embracing the sides of the rim of said wheel, substantially as described.

In testimony whereof I affix my signature in presence of two witnesses.

LOUIS THOMAS KNOWLES.

Witnesses:
HARRY D. KILGORE,
BERNICE G. WHEELER.